United States Patent
Schleicher

(10) Patent No.: US 7,472,083 B2
(45) Date of Patent: Dec. 30, 2008

(54) DOCUMENT EXCHANGE

(75) Inventor: Stephen Schleicher, Boise, ID (US)

(73) Assignee: Amphire Solutions, Inc., Redwood City, CA (US)

(*) Notice: Subject to any disclaimer, the term of this patent is extended or adjusted under 35 U.S.C. 154(b) by 1250 days.

(21) Appl. No.: 10/017,858

(22) Filed: Dec. 14, 2001

(65) Prior Publication Data

US 2003/0115119 A1 Jun. 19, 2003

(51) Int. Cl.
*G06Q 40/00* (2006.01)

(52) U.S. Cl. .................. 705/35; 705/38; 707/202; 707/3; 283/57; 283/58; 283/59

(58) Field of Classification Search ............. 705/35–45; 340/5.2–5.23; 283/57–59; 707/202, 3
See application file for complete search history.

(56) References Cited

U.S. PATENT DOCUMENTS

| 5,892,900 | A | 4/1999 | Ginter et al. ................ 395/186 |
| 6,125,391 | A | 9/2000 | Meltzer et al. .............. 709/223 |
| 6,141,653 | A | 10/2000 | Conklin et al. ................ 705/80 |
| 6,219,423 | B1 | 4/2001 | Davis ........................ 380/268 |
| 6,295,513 | B1 | 9/2001 | Thackston ..................... 703/1 |
| 7,013,426 | B1* | 3/2006 | Ingersoll ..................... 715/523 |
| 2001/0027459 | A1* | 10/2001 | Royal ......................... 707/513 |
| 2001/0051878 | A1* | 12/2001 | Yong ........................... 705/1 |
| 2003/0014384 | A1* | 1/2003 | Ewald et al. .................. 707/1 |
| 2004/0064351 | A1 | 4/2004 | Mikurak |

OTHER PUBLICATIONS

Frey, Bruce, Book "Online Auctions" ISBN: 0-7821-2708-8, 2000, publisher SYBEX.*
PCT International Search Report dated Nov. 14, 2002, International App. No. PCT/US02/15745, Amphire Solutions, Inc.
"TIBCO's Enterprise Application Integration Solutions" *TIBCO Software, Inc.*, (2000).

* cited by examiner

*Primary Examiner*—Mary Cheung
*Assistant Examiner*—Kirsten S Apple
(74) *Attorney, Agent, or Firm*—Hickman Palermo Truong & Becker LLP

(57) ABSTRACT

In an e-commerce context, a method and system are provided for exchanging documents in transactions between partners. The partners are joined in an exchange network and are communicating with each other via a hub entity. The documents are transformed from one partner's native format to another partner's native format via an interim standard document to which a common process is applied. The common process applies partner-specific rules to the standard document.

28 Claims, 7 Drawing Sheets

DOCUMENT EXCHANGE

BACKGROUND OF THE INVENTION

1. Field of the Invention

This application relates to information technology (IT) infrastructures and, specifically, to such infrastructures in the e-business environment.

2. Background Art

Business transactions between organizations often involve exchange of documents. Typically, documents have been moving across organizational boundaries by facsimile or by e-mail via networks such as the telephone and Internet. One example involves ordering and invoicing via direct e-mail between business partners. These methods of direct communications between business partners have improved over time in no small part thanks to the proliferation of e-commerce as well as advances in IT infrastructures as facilitators of e-commerce transactions. With such IT infrastructures, systems have been able to communicate and interact directly with each other.

However, in the distributed and diverse IT infrastructure environment of systems, applications and databases, each system creates, stores, and presents documents in its native format. Thus a problem arises of solving incompatibilities between systems and, in turn, between their native document formats.

One approach was adopted where, the documents are sent and received by each system in its native format where along the way transformation or mapping facilities resolve the incompatibility between such systems. This is illustrated in FIG. 1 where the incompatibility between the systems of business partners A and B is resolved by direct mapping from the native format of partner A's system to the native format of partner B's system, and vice versa.

However, the direct mapping imposes a significant maintenance burden because the mapping facilities will have to adapt to changes in the corresponding formats. Direct mapping is maintenance intensive in that the business rules have to be duplicated in each map for each partner. Namely, for an organization that does business with, say, 5 partners, each of which using its individual native document format, there will be 5 maps (each one having the duplicated business rules for the document source partner). And, in data mining, one cannot count on particular data being at a desired place and time. In addition to data mining issues, it is also very difficult to apply a standard set of business logic if the same document is in several different forms based on the requirements of the receiver. Moreover, these approaches do not support scalability, flexibility and timeliness, nor do they provide load balancing. In this environment, flexibility is desired in terms of properly accommodating business-partner-specific rules and policies. And, scalability is desired not only in terms of improved performance and system capacity but also in terms of adding business partners to the system, and in a timely fashion. Accordingly there is a need for a better approach than the foregoing. The present invention addresses these and related issues.

SUMMARY OF THE INVENTION

The present invention provides a method and system for exchanging documents in transactions between partners that use different document formats and apply distinct business rules. The partners are joined in an exchange network and are communicating with each other via a hub entity. This allows them to apply common trading and data warehousing processes without regard to their individual document formats. The documents are transformed from one partner's native format to another partner's native format via an interim standard document to which a common process is applied. The common process applies partner-specific rules to the standard document.

Advantages of the invention will be understood by those skilled in the art, in part, from the description that follows. Advantages of the invention will be realized and attained from practice of the invention disclosed herein.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

Figure 2:
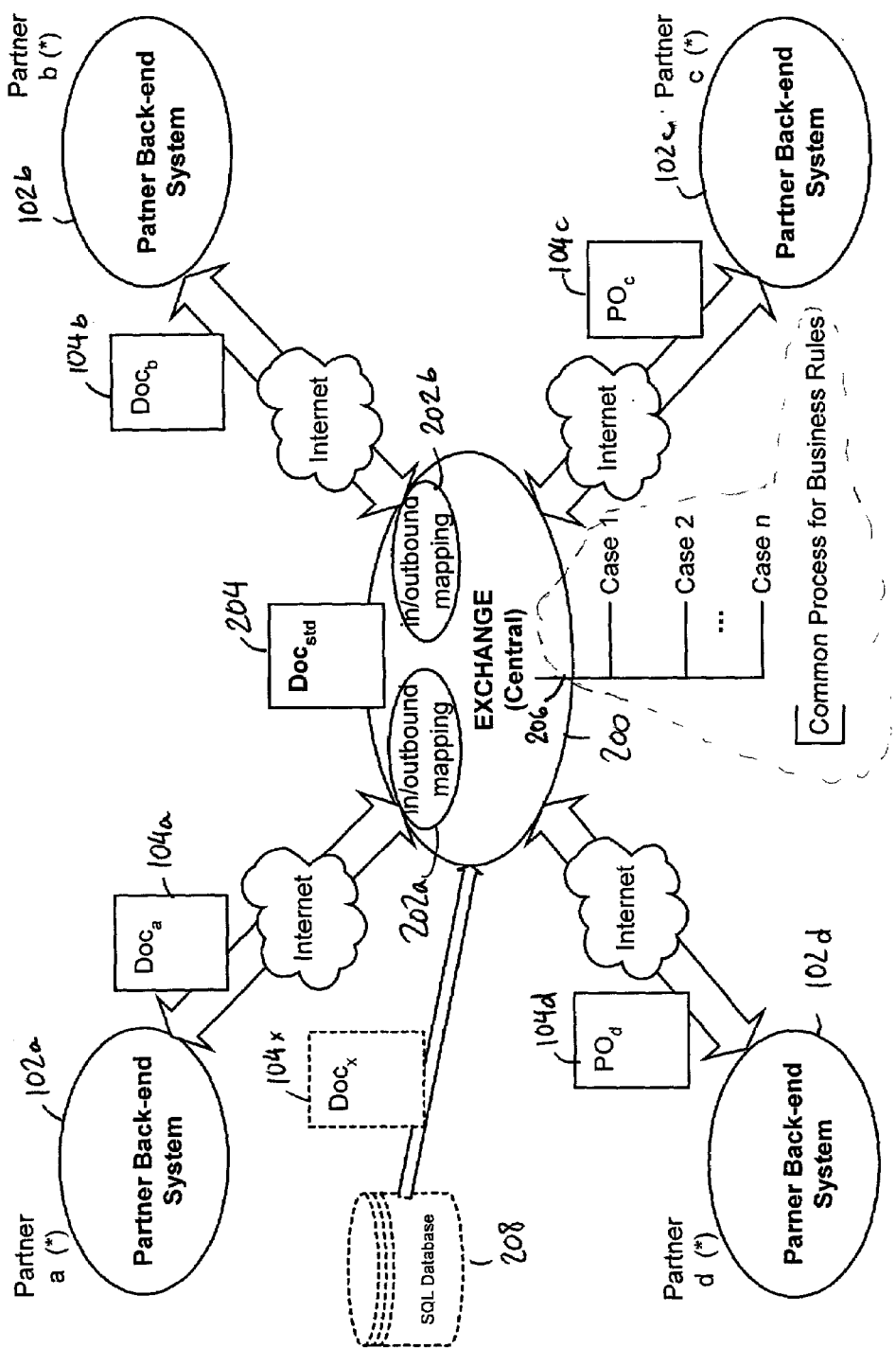
FIG. 2 illustrates an implementation of the Document Exchange concept.

The present invention relates to information technology (IT) infrastructures and, among others, to the problem of solving incompatibilities between systems and, in turn, between their native document formats. According to the aforementioned direct mapping approach the documents are sent and received by each system in its native format and along the way transformation or mapping facilities resolve the incompatibility between such systems. Among others, a notable focus of the present invention is providing for the deficiencies of the direct mapping approach. The functional and architectural strategy of the present invention is realized by implementing a "document exchange" as illustrated in FIG. 2.

It is noted that the preferred embodiment of "document exchange" was developed by Amphire Solutions, Inc. of Boise, Idaho. Accordingly, in referring to the preferred embodiment of "document exchange" a reference is made in fact to "Amphire Exchange™" by Amphire Solutions, Inc. To simplify the discussion however, document exchange and Amphire Exchange™ may be hereafter referred to collectively as "Exchange".

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

Exchange Overview

As mentioned, the Exchange operates in the context of resolving incompatibility between systems and, in turn between their native document formats. Exchange permits business partners to send and receive documents, such as purchase orders or invoices, in their native formats. In facilitating the mapping between formats, Exchange accommodates business-partner-specific rules. In that regard, Exchange incorporates common business rules in a standard document format, but without affecting all mappings associated with existing formats when one of the mappings changes or when a new mapping is added. Thus, as illustrated in FIG. 2, Exchange can be interposed between business or trading partners (hereafter "partners") such that the standard document format is the interim format between any two document formats. In one embodiment, the Exchange 200 is installed in a system within the IT infrastructure of a business entity, such as Amphire Solutions, Inc., which serves as a hub or a center for all the documents exchanged between business partners. Such entity can be referred to herein as the "hub entity". Notably, the system of each partner, e.g. 102a, may have its own dedicated Exchange (not shown) that communicates via the Internet with Exchange 200 (referred to in FIG. 2 as the "Central Exchange"). Moreover, the hub entity itself can be a partner, leveraging its system capacity.

As further illustrated in FIG. 2, when partner-a 102a sends a document 104a (e.g. purchase order, invoice, shipping label, etc.) intended for partner-b, that document is first transformed by the mapping facility 202a in the Exchange from its native format into the standard document format. In this case the mapping facility 202a operates to provide inbound mapping. For clarity, the transformed document 204 will be referred to as the "standard document". The standard document format is a more flexible format accommodating the common business rules. Then, assuming that it resides at the hub entity, the Exchange 200 applies the business rules and policies of the hub entity and partner-a to the standard document 204. The rules and policies are applied using a common process for business rules 206 which takes into account the partner-specific rule cases (1, 2, . . . n) That is, the Exchange employs the same common process 206 but with partner-specific rules. In the illustrated example, the next mapping facility 202b is employed in an outbound direction for converting the format of the resulting standard document into the native format of the document intended for partner-b. Although not shown, this could apply to documents exchanged between any of the partners including partner-c and partner-d (102c&d).

Figure 1:
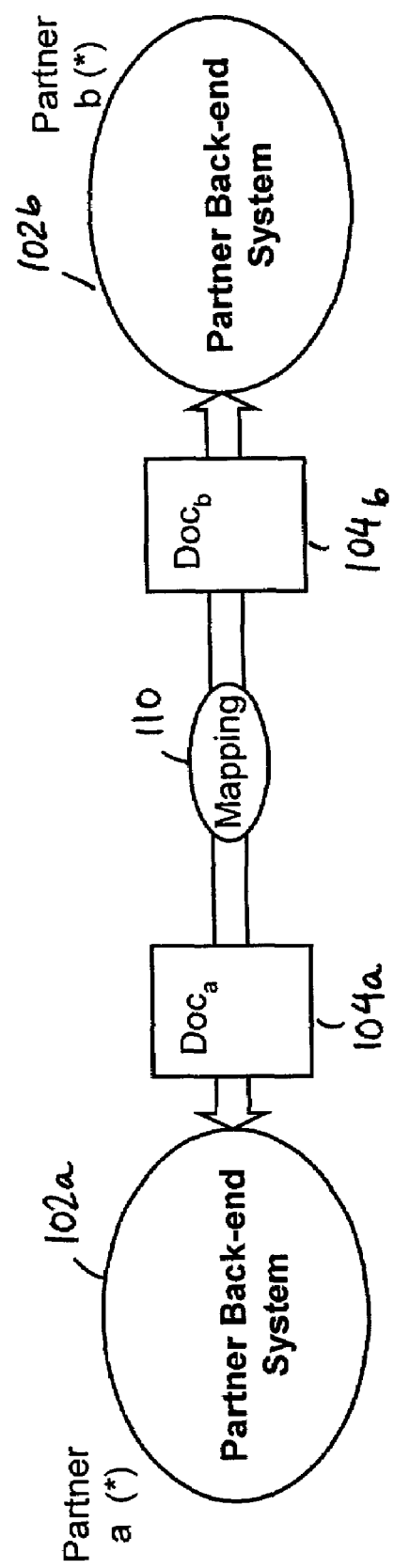
FIG. 1 illustrates direct mapping between native formats.

Thus, as each new partner (e.g., 102d) joins the Exchange, what needs to be created is only the mapping between the native document format of that partner's system and the standard document format. All the other mappings between the native document format and the standard document format for previously joined partners are already present in the Exchange and need not change by reason of the new addition. For example, as the respective mappings between the native document format and standard document format for partner-a and partner-b already exists in the Exchange, such mappings need not change by the addition of a mapping between the native document format of partner-d's system and the standard document format. A document sent from partner-d to partner-a will undergo a transformation from partner-d's native document format using the newly added mapping, followed by application of rules at the Exchange and followed by transformation via the pre-existing mapping from the standard document format into partner-a's native document format. This approach avoids the mapping maintenance associated with direct mapping (as shown in FIG. 1) each time a new partner joins the system.

It is noted however, that mapping is document-type-specific. Namely, mapping is created for each document type. And, as long as partner-d intends to send the same document type, for which the mappings for partner-a and partner-b have already been created, such mappings can be reused in communications with partner-d. Conversely, if the document type to be exchanged is different, a new mapping for each partner will have to be created to accommodate for this particular document type. Obviously, in any particular industry the documents used are typical for that industry (e.g., for a supply chain the documents can be of the purchase order, invoice or any other type). Thus the mappings can be set for all the typical documents associated with that industry for each partner that joins the system.

Figure 3:
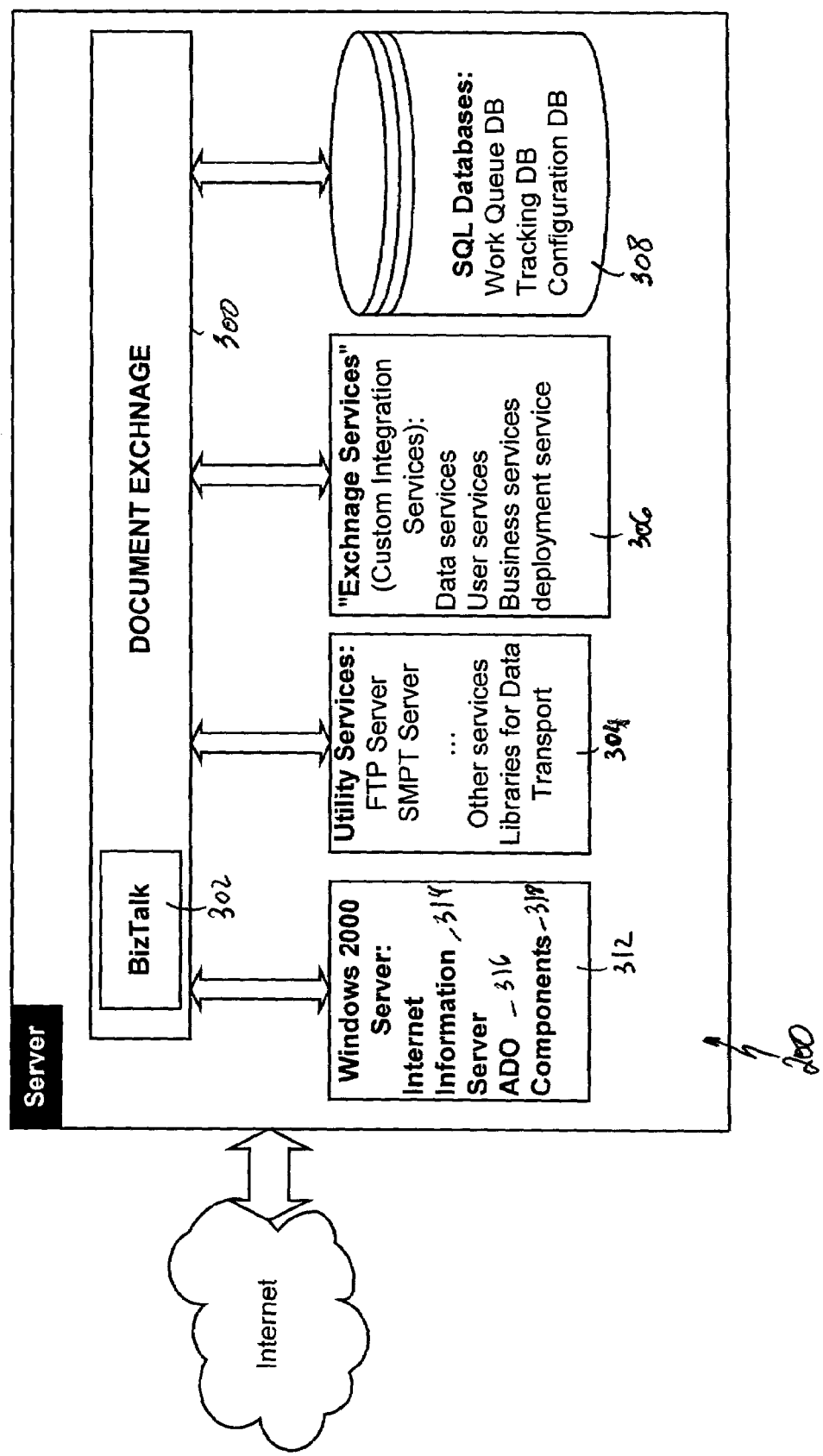
FIG. 3 shows internal components of the Document Exchange.

For the purpose of creating the mappings, Exchange 200 is configured with a document exchange capability 300 that included a BizTalk server 302. FIG. 3 illustrated Exchange 200 in more detail. Preferably, the document exchange exists independently of the system front-end, and it enables exchange via HTTP (hypertext transfer protocol), SMTP (simple mail protocol), FTP (file transfer protocol), XML (extensible markup language) and EDI (electronic data interchange). It is noted that for EDI documents that are routed through the Exchange, custom post-processors and pre-processors are preferably provided because of the unique way Exchange was designed. Indeed, any other Exchange that is based on the approach as described herein will require the same custom components in order to get around EDI issues.

The Biztalk server provides BizTalk utilities (also known as BizTalk tools). The BizTalk framework fosters a common XML message-transfer language to tie distributed and diverse systems. With XML as a platform-neutral data representation language businesses employing incompatible computer technologies can communicate and share data. The BizTalk framework guides the manner in which standard data structures (schema) are published in XML and the manner in which XML-based software and data integration can be achieved. Schema is used in defining the organization and structure of relational databases and object-oriented databases. The BizTalk framework is provided as a set of BizTalk tools to create and design XML definitions (akin to the aforementioned native document formats), map data from one definition to another and allow transfer of data from one database to another. BizTalk tools are provided to manage XML-based data exchange and transfer across diverse platforms and XML-based data flow over the Internet. Biztalk tools are further provided for document verification. BizTalk-based products, such as BizTalk Server 2000™ by Microsoft Corp. of Redmond, Wash., provide a set of development tools that allow creation of applications for performing the foregoing functions.

Hence, in the case of the present invention, the BizTalk tools and a high-level language or graphical tool can be used to define business rules and processes for each partner that joins the system. Then, the mappings (between the new partner's native document format and the standard document format) can be created by using the graphical tool in a drag-and-drop fashion. The resulting mappings are partner-specific rules driven. It is noted that when the hub entity participates also as a partner, mapping to the standard document format is not necessary (because this is its native format).

Once the mappings are created, they are stored for future use in the database (308, FIG. 3). Namely, as mentioned in conjunction with FIG. 2, document formatting is done by the mapping facilities (e.g., 202a) and calculations and validations (also facilitated by the BizTalk tools) are performed as part of the common process 206 that implements the business rules. As mentioned before, although the common process is similar for each document exchange, the business rules, process and policies for each partner are different and the result is, therefore partner-specific.

In addition to the database for storing the mappings, which, as shown in FIG. 3, is referred to as the configuration database, the databases 308 include a work queue database and a tracking database. The configuration database defines how the documents are handled (including the mapping), where to send the documents and the like. The tracking database tracks the history of actual documents as they are handled by exchange. The work queue database holds a queue of tasks to be performed, e.g., documents to be handled (or processed).

It is noted that Exchange is preferably implemented as a set of physically separate servers that are integrated to form the Exchange functionality (shown in FIG. 3 by the arrows to document exchange). Each server embodies one or more functional entities. This configuration improves performance and scalability. Exchange services (preferably implemented as Amphire Exchange Service™) 306 is a set of custom integration services that share in or integrate these functional entities to provide the Exchange functionality. The Exchange services include user services, business services, deployment services and data services. The Exchange functionality will be described in more detail later.

Hence, as is further shown in FIG. 3, Exchange includes utility services such as FTP server, SMTP server and other libraries for data transport. The FTP server facilitates transfer of files over the Internet. Like the hypertext transfer protocol (HTTP), which transfers web page display related files, and the simple mail transfer protocol (SMTP), which transfers e-mails, FTP is an application protocol that uses the TCP/IP (transmission control protocol/Internet protocol). In the present case, the FTP server is used to transfer files (or documents) to the Exchange for processing and communications with partners. (In general, FTP is used for regular document file exchanges and HTTP for "posting" documents over the web.)

It is important to note that, although the Exchange is preferably configured as an N-tiered distributed application, an N-tiered architecture is not critical to the operation of the Exchange. In an N-tiered architecture, N is typically and preferably greater than one. A configuration that is also typical although not necessary to the N-tiered architecture includes multiple distinct servers.

Figure 4:
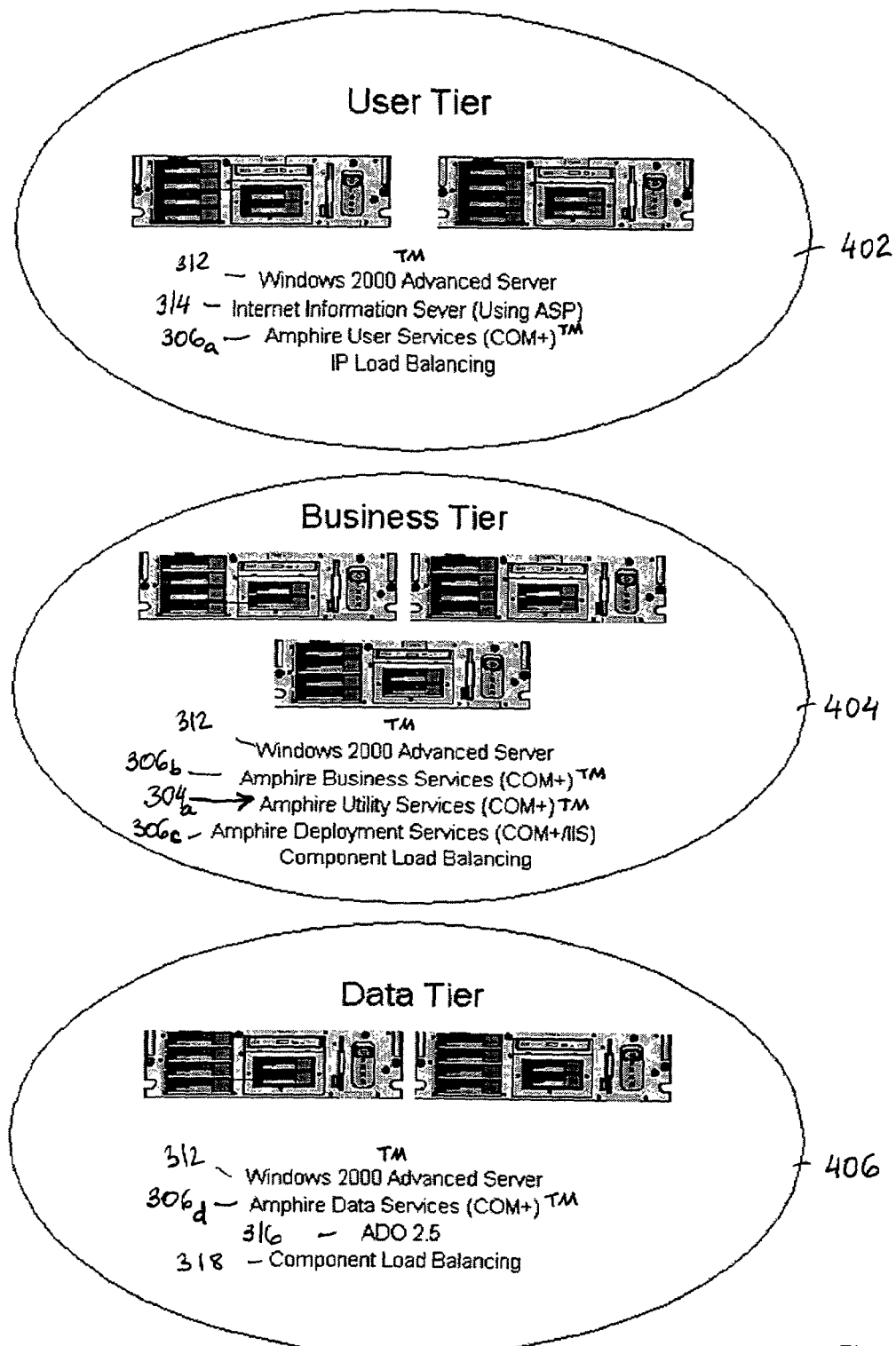
FIG. 4 illustrates Exchange configured as the three-tiered distributed application.

In one embodiment, the Exchange is configured as a 3-tiered distributed application, where its three layers are: the "user" tier 402, the "business" tier 404 and the "data" tier 406. This embodiment is shown in FIG. 4. The platform for all the tiers is in this case the Windows 2000™ server platform (312 FIG. 3) by the Microsoft Corp. It is further important to note that although the Exchange is designed on the Windows 2000™ Server platform, it is by no means limited to such platform. As implemented, this platform includes an Internet information server 314, the aforementioned SMTP server (as part of the utility services 304), ADO (ActiveX Data Objects) access, component services and queued components. Part of the data layer 406, ADO is an application program interface from the Microsoft Corp. that lets a programmer writing Windows applications to get access to a relational or non-relational database.

In the 3-tiered architecture the user tier includes the Internet information server 314 and user services 306a, and is tied to a web server. The Internet information server 314 allows dynamic building of active server pages (ASP, or ASP+). ASP allows a web site builder to dynamically build a web page by inserting in the web page queries to a relational database (such as the configuration database 308, FIG. 3). ASP+, a newer generation of ASP, allows separation of code and contents. The user services 306a (part of the Exchange services 306) include in-process reference to intrinsic ASP objects (Response, Request), HTML (hypertext markup language) building service, and a service for preparing large forms for the business layer.

The user services employ COM+ (extended component object model) that offers an object-oriented programming architecture and a set of operating system services which provide a framework aimed at developing and supporting program component objects.

Indeed, in this embodiment the user services 306a in the user tier, the business services 306b, utility services 304 and deployment services 306c in the business tier, and the data services 306d in the data tier are all designed for employing COM+. (Note the these services have been developed by Amphire Solutions, Inc. Hence the trademark indications are provided in this document.)

The business tier includes the business services 306b (with customer object, order object, etc.) and utility services 304. The utility services 304 in one or more servers include FAX Wrapper services, SMTP SMPT Wrapper services, FTP Wrapper services, ad campaign Services, ad report services and deployment services (for automated building of applications). In general, a wrapper is data that precedes or frames the main data or a program (or script) that sets the stage for successfully running another program. In the context of databases, a wrapper can be used to determine who has access to data that is wrapped. In the context of the Internet, "http://" and "ftp://" are at times described as wrappers for Internet addresses or uniform resource locators (URLs) that follow.

The data tier includes the data services optimized by return type (string, integer, etc . . . ), application support for multiple data sources, native support for XML-based mobile or handheld development (e.g., PocketPC™/Palm™), and built in cache-on-demand (Shared Property Manager).

As will be described in more detail below, the functionality of Exchange in the shown embodiment is a combination of these three tiers.

Exchange Functionality Illustrated by a Purchase Order Process

As outlined, the technology that fashions the Exchange for dynamic business-to-business integration services spans across applications, platforms, and businesses, over the Internet. In one instance, Exchange is fashioned with functionality for handling the procurement of goods using a purchase order process. The discussion below demonstrates the functionality of Exchange in this context.

This discussion explains the purchase order process and how it can be easily modified to accommodate future requirements. Preferably, this process is one aspect of the scalable Amphire Exchange Network Architecture™ (AXNA), and its description can give insight into the specific problem of how the hub entity (Amphire solutions, inc., in this case) can develop, manage, and quickly deploy solutions to complex business scenarios (with scalability and repeatability in mind). However, while these are important concepts to understand, they are beyond the scope of this document. Thus, the following discussion will focus on the functionality of Exchange in the context of a purchase order process.

With the Exchange, the purchase order process becomes a repeatable and scaleable process for exchanging documents as they relate to the procurement of goods from a supplier. These documents include purchase orders, purchase order acknowledgments, advance shipping notices (ASN) and functional acknowledgments (receipts). The documents can be received and sent in any format (e.g., XML, EDI, HTTP, SMTP, FTP, etc.) that is used by a trading partner in the hub entity's network, i.e. the Exchange Network™. For the purpose of this discussion the supplier is a trading partner with a distributor (both of whom are trading partners in the hub entity's network, i.e., the Exchange Network™).

In this example, the distributor sends XML-based purchase orders and receives purchase order acknowledgments, and ASNs as fixed-length flat files. The supplier receives and sends all its documents via EDI through their EDI VAN (value added network, i.e., a local, regional, or global network on which trading partners are enabled to share data over high bandwidth connection. Exchange allows these two trading partners to exchange documents without worrying about the individual native format each of them is using. At the same time, Exchange allows this process to be scalable and repeatable in that it enables other trading partners to join the Exchange Network™ and make use of the pre-existing mapping facilities for exchanging documents with existing partners. Namely, as mentioned before, Exchange allows trading partners to join the Exchange Network™ without the need to re-create or update existing mapping facilities for a particular type of document (e.g., purchase order or the like). In addition, Exchange provides document tracking, reliable processing, order validation, and recovery mechanisms.

Figure 5A:
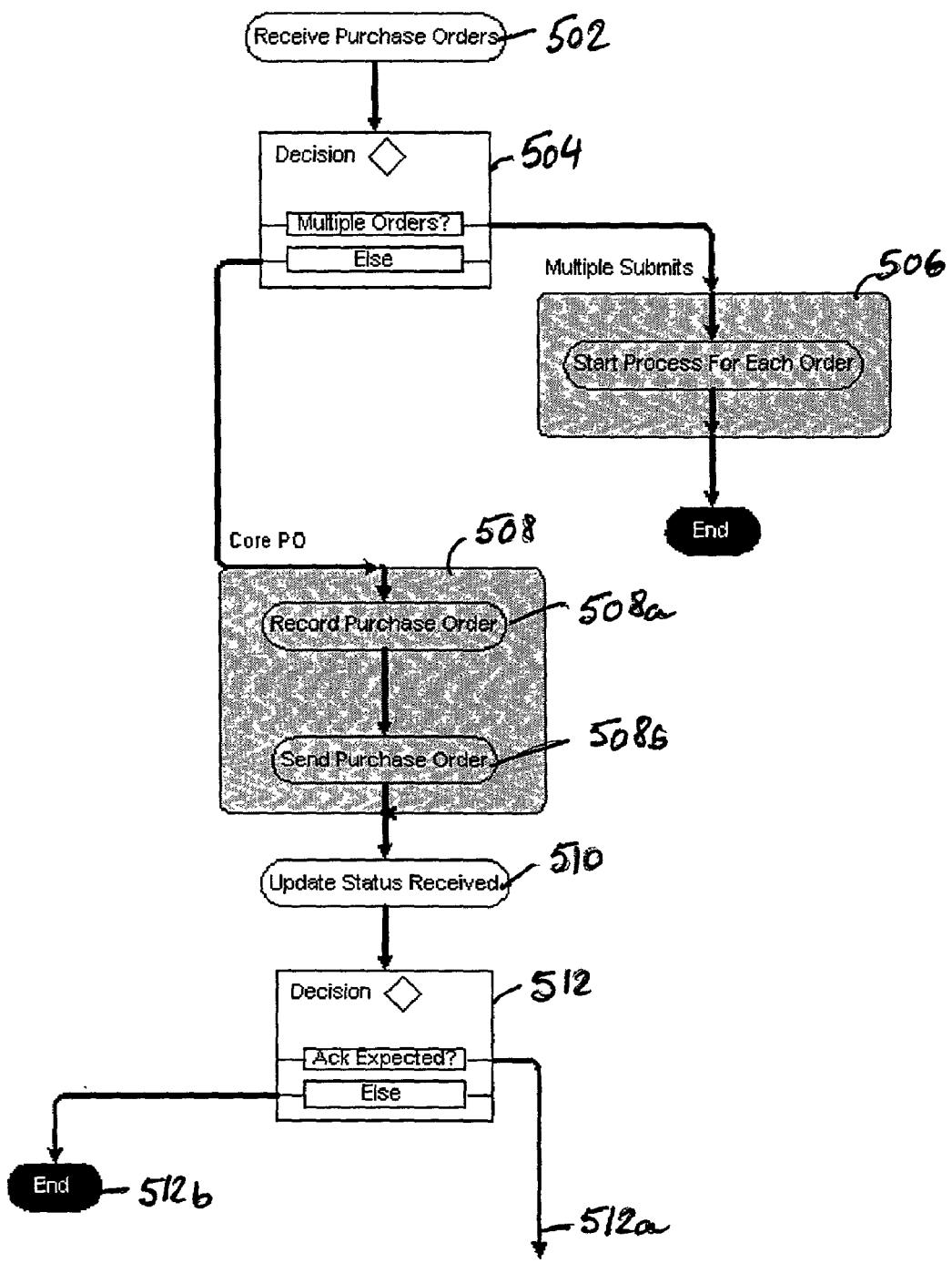
FIGS. 5A and 5B are two parts of the flow diagram representing the purchase order process. (Note that the steps within shaded boxes represent one logical step such that if any one of the steps within the process fails all work done within that box will be rolled back to it's original state. Note also that the circled-X represents the cancellation of the order and triggers notification mechanisms.)
Figure 5B:
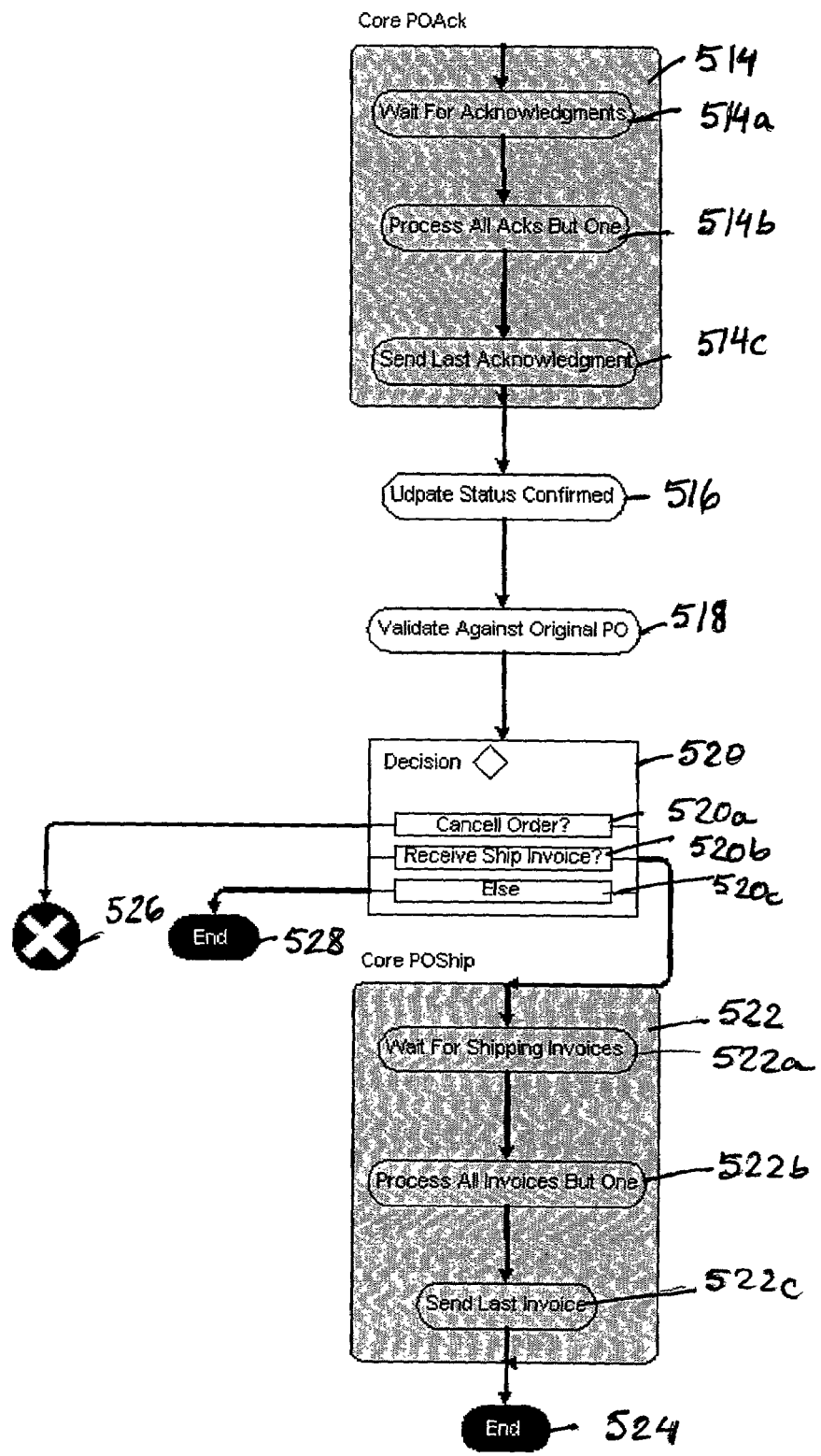

The purchase order process consists of steps and decisions that occur during the lifetime of the transaction, all of which work together to achieve the goals mentioned in the introduction. FIGS. 5A and 5B are two parts of the flow diagram representing the purchase order process. Note that the steps within the gray boxes represent one logical step such that if any one of the steps within the process fails all work done within the gray box will be rolled back to it's original state. Note also that the circled-X represents the cancellation of the order and triggers notification mechanisms.

In addition, note that "agreement(s)" define the business rules that determine how the trading partners send and receive documents. Agreements define also the format for such documents.

Figure 6:
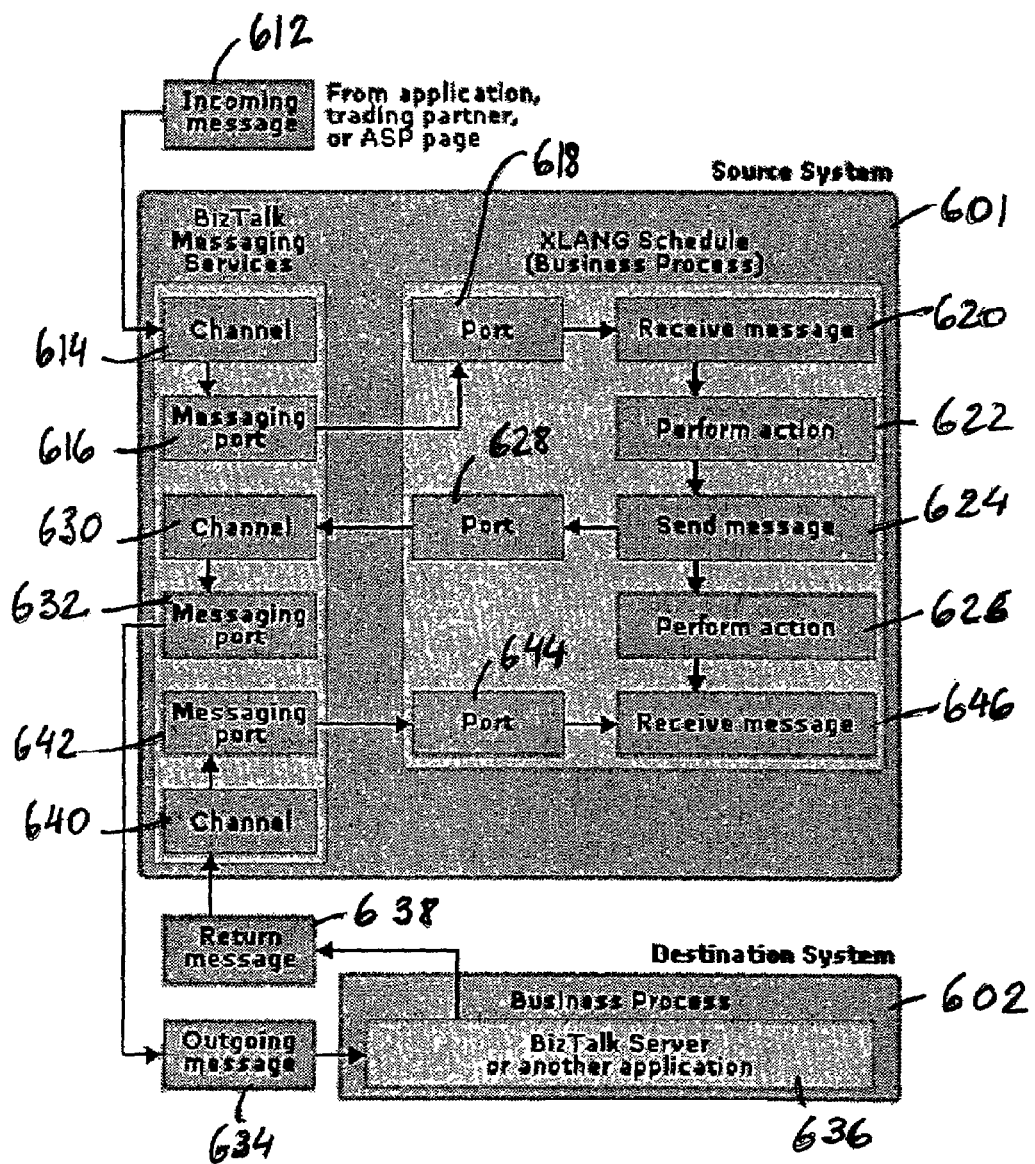
FIG. 6 shows the work that is done outside the process flow to complete the document exchange within the network of the hub entity (e.g., Amphire Exchange™ Network, where Amphire solutions, Inc. is the hub entity).

While the purchase order process as described herein is central to the proposed approach for handling transactions involving procurement of goods, it does not represent the entire solution. The other part of this solution, shown in FIG. 6, includes the work that is done outside that process to complete the document exchange within Exchange Network™, the network of the hub entity (e.g., Amphire Exchange Network™). This part includes the path a document takes between the source and destination systems. For example, an incoming message (612) from a partner is first processed by the BizTalk messaging services (via 614, 616 . . . ) before it then goes through the business process (via 618, 620, 622 . . . ).

As shown in FIGS. 5A and 5B, the purchase order process includes steps as hereafter outlined.

Receive Original Purchase Order from Buyer (DISTRIBUTOR)—502

To start this process, file receive locations exist for trading partners (in this example, distributors) at which purchase orders can be 'dropped off' (or placed). Such locations are password protected so that only trading partners that provide the correct identity with the documents they send can place files at such location. Once placed, the file is picked up, validated against the distributor's agreement, and mapped to the hub entity's standard purchase order format. After transforming the document into this common (standard) format, it is sent to a reliable message queue that is monitored by a process that will kick off a new purchase order schedule (process). While the distributor uses a file receive location as a drop point, other mechanisms are available and are often preferred over FTP.

Start New Purchase Order Processes if this Document Contains Multiple Purchase Orders—504

The purchase order process can handle multiple documents within a master document. If more than one purchase order exists within the document, they are extracted out and put individually into the message queue that starts a new purchase order process per document 506 (see work queue database 308 in FIG. 3).

Record Purchase Order Information to Database—508*a*

Information about the document is tracked in two places. First, information about the way a document is routed within the Exchange Network™ is recorded to allow tracking the document by internal processes. Second, information in the document that is specific to the purchase order is recorded in the order database where it can be viewed by other applications, such as the Community application (preferably the one known as the Amphire Community™), that are related to Exchange. Part of this step is to assign a unique key to the document/purchase order for all future reference points. This key is sent along with the outgoing document to the seller (supplier).

Send Purchase Order to Trading Partner Per Agreement Definition (Supplier)—508*b*

For each document that is received or sent via the Exchange Networks™, an agreement is setup that defines the format of the document (data) and how the data is to be sent (EDI, HTTPS, MSMQ, etc.). It also includes information specific to the receive location that is then required to transfer the document (username, password, server). Accordingly, in this step the purchase order is passed to the supplier (seller) via the process that sets the rules in the agreement.

Update Order Status in Community to Received—510

Whenever a document is successfully sent to that trading partner via the agreement setup for that document/partner, the status of this submission is recorded to the order database where it can be viewed from within the Community application. While order status is currently the only information being updated throughout the submission process, other information can be easily added to this step.

Wait for Purchase Order Acknowledgment if One is Expected—512, 514*a*

At this step, a decision is made whether to wait for a purchase order acknowledgment. This indicator is included within the document. If an acknowledgment is not expected the instance of the order process ends 512*b*. Before ending, the status of the order is set to 'complete'. If an acknowledgment is expected 512*a*, the process waits for an acknowledgment to be received 514*a*. It does this by monitoring a message queue in which all acknowledgments are placed when received. While waiting for a response, a timeout can be specified that will cause the process to initiate a notification after the time specified as the timeout has elapsed. Regarding timeout, a common scenario might involve a trading partner that requires an acknowledgment no later than 6 hours after receipt of the original purchase order. Once that time expires, the purchase order request is voided and the appropriate parties are notified.

Every document has a place-holder that can let the Exchange know whether or not to expect follow-up documents. When these documents are received, they ran through their own document-specific and partner specific business rules. However, while an acknowledgment and invoice are both listed as a part of the process, neither are requirements for completing a document exchange. It is the process that relates to purchase orders which has the built-in support for handling timed-events. In particular, it is the purchase order process that supports the predetermined wait period for acknowledgements or invoices at the end of which an error handling is initiated if the acknowledgements or invoices fail to arrive.

Receive Purchase Order Acknowledgment from Supplier (Seller)—514b

File receive locations exist at which partners (e.g., suppliers) can place EDI documents (Acknowledgments 855). As mentioned before, such locations are password protected, so that only partners that identify themselves correctly (i.e., produce correct identification) when sending a document can place files in these locations. Once placed, the file (containing the document) is picked up. Then, after the file is validated against that partner's (e.g., supplier's) agreement, it is mapped to the standard document format (e.g., standard purchase order acknowledgment format) of the hub entity.

Again, it is important to note that, for each document type, each and every document sent or received in a native format of its respective partner's system is mapped to and from the same standard document format that applies to that document type. For this reason, the standard document format can be also termed the "hub entity's common standard" or, in short, the "common format" as it is indeed common to all the partners and is platform neutral (where the hub entity is Amphire Solutions, Inc. this format may be termed the Amphire Common Format™).

Then, after transforming the document into the common standard, it is sent to a reliable document queue that is monitored by a running process which waits for documents to continue processing (see, e.g., databases in FIG. 3). While in this example supplier uses an EDI VAN as a file receive location for its documents, other mechanisms are available which are less costly.

Send the One or More Acknowledgments to their Respective Instance of Purchase Order Process—514b, 514c The current acknowledgment process can handle multiple documents (e.g., multiple purchase order acknowledgements) within a master document. If more than one acknowledgment exists within the document, they are individually extracted and put into the document (or message) queue where other running processes can handle them one at a time.

Validate Acknowledgment Information Against Original Purchase Order from the Distributor (Buyer)—518

Since data from the original purchase order has been recorded, trading partners in the Exchange Network™ can be notified of any inconsistencies that may exist between, for example, what was originally ordered and what the seller (supplier) is acknowledging and/or is planning to ship. This notification can be provided before the shipment leaves the supplier's loading dock. Inconsistencies that are checked for are based on the business rules of the partners and can include such items as price, quantity, and product numbers. If the business rules specify a threshold of inconsistency, this threshold can trigger a cancellation process for the purchase order 520.

Send Acknowledgment to Buyer (Distributor) Per Agreement Definition —514b

For each document that is to be sent to the Exchange at the hub entity or received through the Exchange, an agreement is setup that defines the format of the document data and how the data is to be sent (EDI, HTTPS, MSMQ). It also includes any information specific to the file receive location that is required to send the document (username, password, server). This process will send the acknowledgment to the distributor (buyer) based on agreement via the rules (agreement) setup.

Update Order Status in Community to Confirm—516

Whenever a document is successfully sent via the agreement setup for that document/partner, the status of this submission is recorded to the order database where it can be viewed from within the Community application. While order status is currently the only information being updated throughout the submission process other information can easily be added to this step.

Wait for Advanced Shipping Notice (ASN) if One is Expected—520, 522

At this step, a decision is made whether to wait for an advanced shipping notice (ASN). This indicator is within the document. If an ASN is not expected, the instance of the order process ends 528. Before ending, the status of the order is set to complete. If an ASN is expected, the process waits for one to be received 522a. It does this by monitoring a document (message) queue in which the ASNs are placed when they are received. While waiting for a response, a timeout can be specified that will cause the process to initiate a notification after the specified time has elapsed.

Send One or More ASNs to Correct Instance of Purchase Order Process Currently Waiting for its Respective ASN—522

The current ASN process can handle multiple ASN documents within a master document. If a plurality of ASN documents exist within that document, they are individually extracted and put into the document (message) queue where other running processes can handle them one at a time.

Send ASN to Buyer (Distributor) Per Agreement Definition—522

For each document that is received/sent via Exchange, an agreement is setup that defines the format of the document data and how the data is to be sent (EDI, HTTPS, MSMQ). It also includes information specific to the file receive location that is required to send the document (username, password, server). This process will send the ASN to the buyer (distributor) via the rules setup in the agreement.

Update Order Status in Community to Shipped—522

Whenever a document is successfully sent via the agreement setup for that document/partner, the status of this submission is recorded at the order database where it can be viewed from within the Community application. While order status is currently the only information being updated throughout the submission process, other information can easily be added to this step.

In summary, while the foregoing discussion described a distributor to supplier purchase order scenario, the hub entity can use the same process for exchanging similar documents generated for example from an access storefront (e.g., the Amphire Access™ storefront). Since everything within the purchase order process uses a common format (the standard document format), additional functionality can be added with minimal impact on those partners already joined to Exchange Network™. For each additional partner that joins, only those agreements that will transform that partner's documents to the common format are required. At that point, the new partner will be immediately able to exchange documents with any existing partner on the Exchange Network™.

Finally, it is noted that, besides PocketPC™/Palm™, as well as Windows 2000™ and Microsoft™ which are the trademarks of Microsoft Corp., the terms and marks herein (indicated with "™") are the trademarks of Amphire Solutions, Inc.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A method for exchanging documents in transactions between partners that are joined in an exchange network, the partners communicating with each other via a hub entity, the method comprising:
    storing an agreement associated with each document type for each partner that joins the exchange network, wherein each agreement defines one or more rules about the data format in which the respective partner sends and receives documents of the document type;
    placing in a file receive location a document from a first partner, the file receive location being password protected such that only a partner that provides a correct identity with any document it sends may place that document at the file receive location; and
    performing steps, by the hub entity, including,
        retrieving the document from the file receive location,
        validating the document against its respective agreement,
        transforming the document into a standard document format that is partner system platform neutral and that is a different data format than the format in which the document from the first partner was received,
        assigning a key to the document for future references,
        processing the document based on the agreement, the process including applying rules of the hub entity and rules of the first partner, and
        based on the corresponding agreement, transforming the processed document from the standard format into an altered document format that is associated with a second partner and sending the altered document to the second partner.

2. A method as recited in claim 1, wherein the agreement defines business rules that determine how documents are sent and received as well as their format.

3. A method as recited in claim 1, wherein the key is unique to the document for all future reference points and it is sent along with the document.

4. A method as recited in claim 1, wherein the standard format is a more flexible format accommodating business rules that are common.

5. A method as recited in claim 1, wherein there is a common process for processing the document based on the agreement.

6. A method as recited in claim 1, wherein setting up the agreement for at partner that joins the exchange network involves creating a document-mapping between a partner's native format and the standard format.

7. A method as recited in claim 1, wherein any document-mapping for mapping from a native format to the standard format for any document type of a previously-joined partner that is already present at the hub entity need not be recreated, thereby avoiding document-mapping maintenance each time a net' partner joins the exchange network.

8. A method as recited in claim 1, wherein the mapping to and from the standard format is document-type-specific.

9. A method as recited in claim 1, wherein the document-mapping is created by using a graphical tool in a drag-and-drop fashion.

10. A method as recited in claim 1, wherein once created any document-mapping is stored in a database.

11. A method as recited in claim 1, wherein although the process is similar for each document, the processing result is different for each partner as it is directed by the partner's business rules and policies.

12. A method for exchanging documents in a trade of goods transaction between partners that are joined in an exchange network of a hub entity, the partners being part of a supply chain and trading with each other via the hub entity, the method comprising:
    sending purchase order document to a seller via a document exchange at the hub entity;
    acknowledging receipt of the purchase order document to a buyer via the document exchange if the purchase order document includes an indication that acknowledgement is expected;
    wherein each of the documents sent or received via the document exchange is respectively transformed into and/or out of a standard format that is partner and system platform neutral and that is a different data format than the format in which the purchase order document was received and is processed based on an agreement that is partner specific and takes into account rules of the hub entity, wherein each agreement defines one or more rules about the format in which the specific partner sends and receives documents of the document type; and
    wherein the document exchange enables trading partners, including the buyer and seller, to exchange documents without the need to consider each other's native formats.

13. A method as recited in claim 12, wherein the trade of goods transaction is repeatable and scalable.

14. A method as recited in claim 12, wherein the purchase order document is a single purchase order document or multiple purchase order documents within a master document, each of the purchase order documents being individually extracted and placed into a message queue for separate purchase order processing.

15. A method as recited in claim 14, wherein an order process instantiated in relation to a master document is capable of handling individually each of a plurality of acknowledgments.

16. A method as recited in claim 12, wherein for each document that is sent or received via the document exchange the agreement defines the format of that document, the manner in which it is sent and information about its receive location.

17. A method as recited in claim 15, wherein the information pertains to username, password and server.

18. A method as recited in claim 12, wherein for each purchase order document conveyed via the document exchange, information about the trade of goods transaction including an order status is recorded to an order database where it can be viewed from within a community application.

19. A method as recited in claim 12, further comprising:
instantiating an order process including
- waiting for acknowledgement if the acknowledgement is expected, including monitoring a message queue in which acknowledgements are placed when received; and
- setting an order status to complete and ending the order process instance if the acknowledgment is not expected.

20. A method as recited in claim 19, wherein a timeout defines a wait period associated with the waiting such that when the wait period elapses the instantiated order process initiates a timeout notification and ends the order process instance.

21. A method as recited in claim 20, wherein if the wait period elapses a purchase order indicated in the purchase order document is considered void.

22. A method as recited in claim 12, wherein each of the documents has a place holder indication prompting the document exchange to expect follow-up documents.

23. A method as recited in claim 12, wherein each of the documents passing through the document exchange is placed in a file receive location that is password protected so that access thereto is limited to a properly identified partner.

24. A method as recited in claim 23, wherein each document extracted from its file receive location is validated against its associated agreement before it is mapped into the standard format.

25. A method as recited in claim 12, further comprising:
detecting any inconsistency between the purchase order document and the acknowledgment; and
- providing notification of any detected inconsistency.

26. A method as recited in claim 12, further comprising:
- checking the purchase order document and acknowledgement for any inconsistency relative to an inconsistency threshold defined in conjunction with the agreement, the inconsistency threshold triggering an order cancellation process if surpassed.

27. A method as recited in claim 12, further comprising:
- if the purchase order document so requires, providing to the buyer via the document exchange one or more of
- an advance shipping notice, and
- a functional acknowledgement.

28. A method as recited in claim 12, further comprising:
providing an invoice to the buyer via the document exchange.

* * * * *